United States Patent [19]
Engel et al.

[11] 4,038,108
[45] July 26, 1977

[54] METHOD AND APPARATUS FOR MAKING AN INSTANTANEOUS THERMOCHEMICAL START

[75] Inventors: Stephen August Engel, Shenorock; Ronald Elmer Fuhrhop, Suffern, both of N.Y.

[73] Assignee: Union Carbide Corporation, New York, N.Y.

[21] Appl. No.: 684,833

[22] Filed: May 10, 1976

[51] Int. Cl.² ............................................. B23K 7/06
[52] U.S. Cl. ...................................... 148/9.5; 266/51
[58] Field of Search ........................... 148/9.5; 266/51

[56] References Cited

U.S. PATENT DOCUMENTS

| | | | |
|---|---|---|---|
| 3,360,398 | 12/1967 | Garibotti | 427/43 |
| 3,597,578 | 8/1971 | Sullivan et al. | 219/121 L |
| 3,656,988 | 4/1972 | Steffen et al. | 148/9.5 |
| 3,749,878 | 7/1973 | Sullivan et al. | 219/121 L |
| 3,966,503 | 6/1976 | Engel | 148/9.5 |
| 3,966,504 | 6/1976 | Sipek et al. | 148/9.5 |

OTHER PUBLICATIONS

Adams, M. J., *The Use of the CO₂ Laser for Cutting and Welding*, Welding Institute Research Bulletin, vol. 9, Sept. 1968.

Sullivan, A. B. J. et al., *Gas-Jet Laser Cutting*, British Welding Journal, Aug. 1967.

*Primary Examiner*—W. Stallard
*Attorney, Agent, or Firm*—Dominic J. Terminello; Warrick E. Lee, Jr.

[57] ABSTRACT

A method and apparatus for making an instantaneous thermochemical start on the surface of a metal workpiece.

The method resides in the use of laser beam focused to a small spot to bring the ferrous workpiece to ignition temperature in combination with a high intensity oxygen jet to cause the initiation of the thermochemical reaction. The laser beam may impinge the workpiece at a point about 1 cm behind the spot where the oxygen impinges the workpiece surface to a point about 10 cm ahead of such spot. Accordingly, the laser beam may penetrate the high intensity oxygen jet and still cause the thermochemical reaction to start instantaneously.

The apparatus resides in a scarfing machine having a scarfing nozzle, an oxygen spreader nozzle and a laser assembly associated therewith. The oxygen spreader nozzle is mounted so as to provide high intensity oxygen jet on the surface of the workpiece ahead of the scarfing oxygen effluent from the scarfing nozzle. The laser assembly is mounted so that its optical system will direct a laser beam on the surface either ahead or behind the point of impingement of the oxygen jet.

25 Claims, 13 Drawing Figures

FIG. II

METHOD AND APPARATUS FOR MAKING AN INSTANTANEOUS THERMOCHEMICAL START

This invention relates, in general, to thermochemical removal of metal from the surface of a workpiece, commonly called scarfing. More particularly, it relates to the making of instantaneous or "flying starts" for scarfing operations. A "flying start," as that term is used throughout the present specification and claims, means the virtually instantaneous starting of a thermochemical reaction on a workpiece which is moving relative to the scarfing machine at its normal scarfing speed, i.e., usually a speed of from about 6 to 45 meters per minute. The lower end of said range being used for scarfing cold workpieces and the upper end for scarfing hot workpieces.

It is well known in the art that a scarfing reaction is started by preheating the metal workpiece to its molten or ignition temperature — normally by preheating flames directed onto a relatively small area — before applying an obliquely directed stream of scarfing oxygen at the molten puddle. The scarfing oxygen stream has a two-fold purpose, first to effect a thermochemical reaction with the metal, and secondly, to blow away the reacted metal thereby exposing fresh metal for the scarfing reaction.

Metal rods have long been used to obtain faster starts in hand scarfing operations, as shown for example by U.S. Pat. No. 2,205,890. Here the work must be stationary and the operator, by his individual skill, must be able to manipulate both the timing of the scarfing oxygen stream, as well as the angle of the torch and the rod. Starting of mechanized scarfing reactions with wire rods is likewise known, as shown by Bucknam et al in U.S. Pat. No. 2,309,096. Scarfing starts described therein are, however, likewise possible only on stationary workpieces.

Flying starts made with the aid of metal powder are disclosed by DeVries et al in U.S. Pat. No. 3,216,867, and those made by use of an energized electrode are disclosed by Lobosco in U.S. Pat. No. 2,513,425 and by Svensson et al in U.S. Pat. No. 3,658,599. Rapid wear of the powder conveying equipment causes powder starts to be unreliable, and this fact plus the cost of the metal powder, render powder starts unsatisfactory. The problems associated with electrically powered starts are relatively complex.

Transferred electric arcs wherein the work is part of the electrical circuit require electrical contact to the moving workpiece. Non-transferred electric arcs wherein the workpiece is not in the circuit require that the electrode by extremely close to the work surface in order to transfer enough heat to bring the workpiece to ignition temperature. This is impractical because of spatial limitations and because the extreme spatter of the scarfing reaction would destroy the arc torch.

Also, more recently it has been discovered, as described in U.S. Pats. Nos. 3,966,503 and 3,991,985, that flying starts may be made by contacting the metal surface to be scarfed with a hot wire. The hot wire is brought to ignition temperature by the heat of the scarfing unit preheat flames or some external heat source. While this process has proven to be successful in situations where several spot scarfing operations are to be performed, it is necessary to provide a plurality of wire feeding units corresponding to the number of scarfing units employed.

Accordingly, up until now it has always been required to use an adjuvant material such as metal powder or wires to bring the workpiece to ignition temperature.

For purposes of this disclosure, high intensity jet means that the oxygen flow rate through the spreader nozzle is greater than the oxygen flow rate through an equivalent width of a scarfing nozzle.

This invention is predicated on the discovery that a high intensity laser beam can be focused to a very small spot on a metal workpiece to be scarfed, which spot is already being impinged by an intense jet of oxygen or is simultaneously contacted by such a jet, and instantaneously cause a thermochemical reaction to be initiated at such very small spot and then spread out to a full spot scarfing pass which is usually from 5 to 25 centimeters wide. It was known that a laser beam could bring a small spot (0.1 to 1 mm dia. and 1 mm to 0.1 mm in depth) to its molten temperature instantaneously, However, it was unexpectedly discovered that such a small shallow spot of molten metal could be spread by a high intensity oxygen jet to a full width spot scarfing pass. It was thought that an oxygen jet of high intensity would blow such a small amount of molten metal away before the thermochemical reaction would be initiated or would cool the spot sufficiently to prevent the reaction from being started.

There are basically two different types of lasers, i.e., continuous wave lasers and pulsed lasers. Pulsed lasers, as the name implies, release their energy in very short high intensity bursts. The instantaneous starts of this invention, like the pulsed laser, are intermittent. For this reason pulsed lasers are preferred in this invention. It will be obvious however that continuous wave laser could be utilized in this invention by pulsing a continuous wave laser by means of a shutter or some other equivalent technique.

Accordingly, it is an object of this invention to provide a simple and reliable process which is capable of making an instantaneous or flying start on a workpiece without the use of any adjuvant material or electric arc.

It is another object of this invention to provide a process capable of making an instantaneous, individual, fin-free spot scarfing cut on a metal workpiece without the use of adjuvant material or electric arcs.

It is still another object of this invention to provide a process cabable of making — in a single pass over the surface of the workpiece — a plurality of instantaneously started, randomly located, selective scarfing cuts on the surface of a workpiece moving at normal scarfing speed.

It is yet another object of this invention to provide a process capable of making an instantaneously started full width scarfing cut on the surface of a workpiece moving at normal scarfing speed.

A further object is to provide apparatus including a laser and lens arrangement with a scarfing unit to make instantaneous or flying starts.

These and other objects which will become apparent to those skilled in the art are achieved by the present invention which consists in one aspect of a method for making an instantaneous thermochemical start on the surface of a ferrous metal workpiece, comprising the steps of:

a. contacting a preselected spot on said surface where the reaction is to begin, with a laser beam.

b. impinging a high intensity jet of oxygen gas on said surface at said spot, thereby causing an immediate scarfing reaction to begin and a molten puddle to form at said spot, and c. continuing the impingement of a high intensity jet of oxygen on said puddle until said puddle has spread to the spot scarfing width desired.

In another aspect, the invention resides in apparatus for making an instantaneous start comprising a scarfing machine having a scarfing unit provided with means for discharging a preheat flame and a scarfing oxygen stream toward a workpiece to be scarfed; an oxygen spreader nozzle mounted on the scarfing machine located in front of said scarfing unit and inclined at its discharge end so as to provide a high intensity jet of oxygen at an angle to the surface of the workpiece some predetermined distance ahead of the scarfing oxygen stream and a laser provided on said scarfing machine having an optical system associated therewith for focusing a laser beam on the surface of the workpiece.

The term "instantaneous" as used with reference to making a thermochemical start, in the present specification and claims, is meant to include "flying starts," as well as starts where there is no relative motion between the workpiece and the scarfing apparatus until the instant the laser beam contacts the preselected spot. At the instant of contact, however, normal scarfing speed is immediately commenced (without waiting for puddle formation as in the prior art) so that the starting process is carried out with relative motion between the workpiece and the scarfing apparatus. If motion is not immediately commenced on contact of the laser beam, the oxygen jet would gouge a hole in the workpiece within a very short time. The relative motion may, of course, be caused by moving either the work surface relative to stationary scarfing apparatus, or vice versa.

After the molten puddle has been spread to its preselected width, the instantaneous start has been completed. The spreading oxygen jet may then be left on and used to carry out the scarfing reaction, or it may be turned off and another oxygen stream may be impinged on the spread puddle at an acute angle to the work surface in order to "take over" and carry out the scarfing reaction. The type of scarfing cut desired will determine the type of scarfing oxygen stream used to "take over" the scarfing reaction from the spreading jet.

An individual, fin-free, spot scarfing cut can be made by discharging at the puddle, an oblique, sheet-like stream of scarfing oxygen gas whose intensity of flow is gradually diminished towards the edges of the stream, reaching zero intensity at the lateral edges of the nozzle orifice from which it is discharged, and which produces a cut which is narrower than the width of said orifice. Such a scarfing cut can be made with the nozzles described and claimed in copending U.S. patent application Ser. No. 607,888 filed Aug. 26, 1975, the entire disclosure of which is incorporated herein by reference.

If selective spot scarfing of the entire surface of a workpiece is sought to be done in a single pass, the scarfing cuts be made not only fin-free, but also in such manner that adjacent cuts will neither overlap nor leave excessively high ridges or deep grooves between them. This requires the capability for discharging at the puddle abutting side-by-side scarfing oxygen streams each of whose intensity of flow diminishes gradually towards its edges and each of which produces a scarfing cut which is at least as wide as its discharge orifice. Nozzles for making such scarfing cuts are described and claimed in copending U.S. patent application Ser. No. 607,887 filed Aug. 26, 1975, now U.S. Pat. No. 4,013,486, the entire disclosure of which is incorporated herein by reference. As these scarfing units pass over the workpiece at normal scarfing speed, they can be turned on and off in a preselected manner to scarf out any random pattern of defects located on the surface of the workpiece.

If a conventional scarfing pass is sought to be made, this can be done by directing an oblique sheet-like stream of scarfing oxygen at the puddle from a conventional rectangularly-shaped nozzle whose intensity of flow is substantially uniform across its entire width. In such case the instantaneous scarfing start provides the benefit of being able to start the scarfing reaction on a workpiece as it comes into register with the scarfing units without having to slow down or stop either the workpiece or the units in order to start the scarfing reaction, as is required when using conventional preheating flames. The instantaneous start permits the scarfing operation to begin immediately upon contact of the apparatus with the workpiece.

Figure 1:
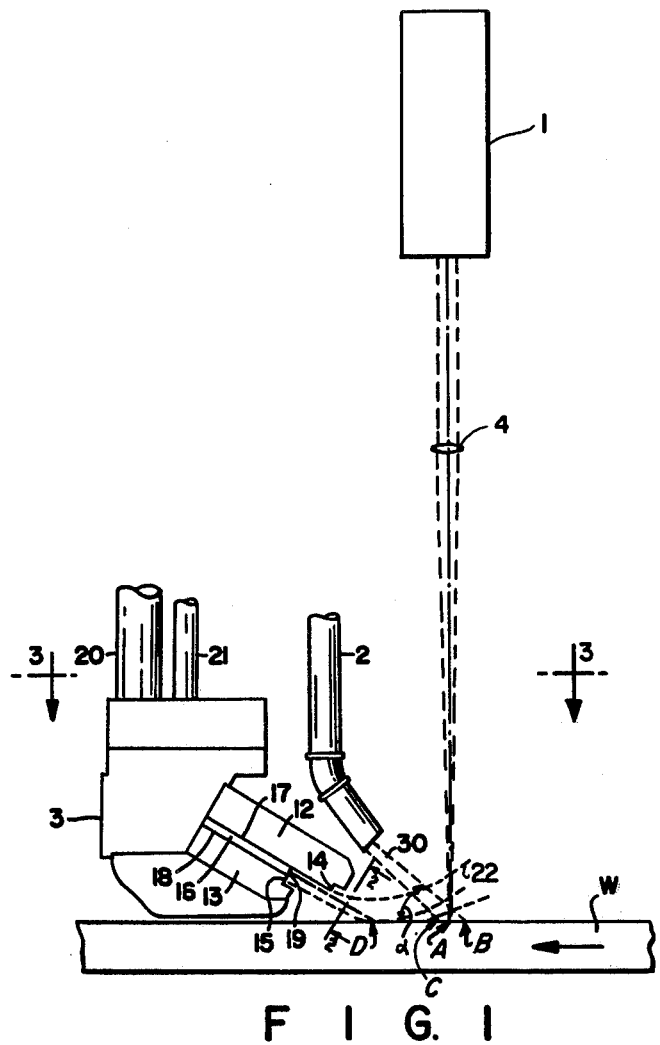
FIG. 1 is a side view illustrating the method and apparatus used for making an individual, fin-free spot scarfing cut with an instantaneous start in accordance with the present invention.
Figure 2:
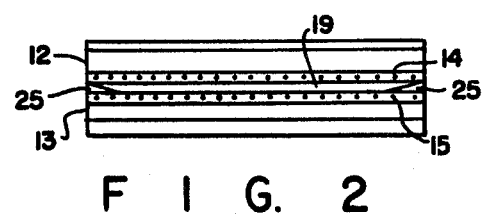
FIG. 2 is a front face view of the scarfing oxygen nozzle orifice taken along line 2—2 of FIG. 1.

In FIG. 1 a laser unit 1, including a focusing lens 4 is mounted either on the scarfing machine or remotely and arranged so that a laser spot makes contact on the surface of the workpiece W at the point A, the point where the spot scarfing reaction, just ahead of the defective spot, is to begin. Oxygen spreader nozzle 2 may be a plain 1–5 cm round bore nozzle. It will produce puddles having widths of from about 5 cm to 25 cm respectively. Nozzle 2 is inclined at its discharge end at an angle to work surface, such that the projected centerline of the oxygen jet (hereinafter referred to as the point oxygen impingement) 30 discharged from the spreader nozzle will strike the work surface at point B. Point A may be ahead of point B to as far behine point B as point C. Point C is the projection of the inside diameter of the spreader nozzle 2. Scarfing unit 3 is comprised of conventional upper and lower preheat blocks 12 and 13, respectively, which may be provided with a row of either premixed or post-mixed pre-heat flame ports 14 and 15 respectively, and suitable gas passages therein. If post-mixed preheat flames are used, and these are preferred for greatest safety, then ports 14 and 15 will be used for discharging a fuel gas which will burn upon ignition by admixture with a low velocity flow of oxygen, emanating from the scarfing oxygen nozzle slot 16 formed by the lower surface 17 of upper preheat block 12 and the upper surface 18 of the lower preheat block 13. The slot oxygen nozzle 16 terminates within discharge orifice 19. In order to produce an individual, fin-free spot scarfing cut, orifice 19 is shaped as shown in FIG. 2. Oxygen and fuel gas are supplied to the scarfing unit 3 through feed pipes 20 and 21, respectively by means well known in the art.

The apparatus shown in FIG. 1 functions as follows: First, the preheat flames emanating from scarfing unit 3 are ignited by actuating the flow of fuel gas from the rows of preheat ports 14 and 15, and a low flow of oxygen gas through orifice 19. These preheat flames, indicated by lines 22, strike the work surface and are deflected upward and backward. When the defective area to be scarfed out of the moving workpiece W reaches a short distance before point B, a high intensity jet of oxygen is discharged from nozzle 2, to impinge on point B on the surface of the workpiece. When the defective area reaches point A, the laser beam is pulsed, causing the spot to immediately reach ignition temperature thereby starting an instantaneous scarfing reaction. The oxygen jet from nozzle 2 causes the small puddle formed by the laser pulse to spread to its full width very rapidly, at which time it is shut off and the scarfing oxygen stream from orifice 19 which is aimed at point D on the work surface is increased to its scarfing flow rate, to take over the reaction from the spreader nozzle. The scarfing oxygen flow is kpet on for as long as the scarfing cut is desired.

The steps following ignition of the preheat flames discharged from scarfing unit 3 may be automated to operate for example through a series of sequenced timers, relays and solenoid valves to that an operator or other appropriate signal will initiate and automatically carry out the sequence of steps described above. A second signal is required to end the cut by shutting off or decreasing the scarfing oxygen flow to an amount just sufficient to maintain the preheat flames on. In this state the apparatus is ready to immediately spot-scarf again.

An alternative way to carry out the above steps in the process is to turn the scarfing oxygen on at the same time as the spreader nozzle jet. The latter, having much more impact will control the course of the thermochemical operation, i.e., will cause the molten spot to spread. Then, as the spreader nozzle oxygen jet is shut off, the scarfing oxygen flow will "take over" the reaction in a very gradual and even, though rapid, manner.

FIG. 2 shows the scarfing nozzle orifice 19 used in the scarfing unit of FIG. 1 for producing an individual, fin-free scarfing cut. Other types of scarfing nozzles usefull in the present invention are described in detail in my above-mentioned copending application Ser. No. 607,888 filed Aug. 26, 1975. It is important to note that a critical parameter of such a nozzle is that the cut it produces is narrower than the width of the nozzle itself. This is necessary in order to obtain a fin-free spot-scarfing cut. This fact, however, prevents such nozzles from being used side-by-side with another such nozzle, because the parallel cuts which they produce would leave an unscarfed surface between the cuts. Hence, such nozzles are useful only for making individual fin-free cuts. FIG. 2 which is a view of FIG. 1 along line 2—2 shows the upper and lower preheat blocks 12 and 13, containing the rows of upper and lower preheat fuel gas ports 14 and 15 respectively. The oxygen nozzle orifice 19 contains triangular inserts 25 at each end of orifice 19, thereby causing the edges of the oxygen stream emanating from the orifice 19 to be gradually less intense, i.e., to have less impact on the work surface.

It is to be noted that while in FIG. 1 point A is behind point B, this distance may vary so that point A may be from about 10 cm ahead to a distance behind point B, which is determined by the projection of the inside diameter of nozzle 2, see point C. Accordingly, point C is determined by the size and shape of nozzle 2. Preferably the distance between A and B is such that point A is about 1 cm in front of point B. The optimum range of the distance between points A and B depends upon the angle $\alpha$ at which the oxygen jet is directed at the work surface; and the size of the jet nozzle. The angle $\alpha$ may vary from about 30° to 80°; the preferred angle is between 50° and 60°. If the angle $\alpha$ of the nozzle is 30° and a two centimeter inside diameter round nozzle is used, the range of distance between A and B should be 0 to 8 cm. If the same size nozzle is used and the angle $\alpha$ is 80°, the range is 0 to 3 cm. Point C, which is the intersection of the projection of the back side of the spreader nozzle 2 and the steel surface, is the limit on the distance behind point B that point A may be and still make a flying start.

FIGS. 3–6 are sketches illustrating how instantaneous or flying starts, made in accordance with this invention, take place. It is important to bear in mind that the sequence of steps illustrated in FIGS. 3–6 represent the reactions which take place in about 1 second.

Figure 3:
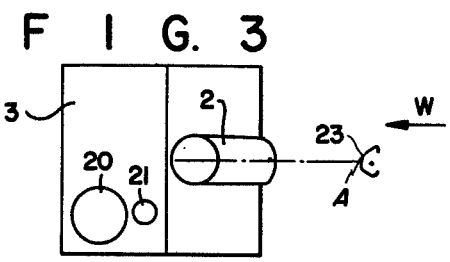
FIGS. 3, 4, 5 and 6 are schematic illustrations of the sequence of reactions, viewed from above along lines 3—3 of FIG. 1, which takes place on the workpiece as an instantaneous start is made in accordance with the present invention.

FIG. 3 shows the time when the laser beam has made contact with point A, the point where the spot-scarfing pass is to begin. The arrow indicates the direction in which the workpiece W is travelling at a speed of about 15 meters/min. Simultaneously, oxygen from spreader nozzle 2 causes ignition of the surface of the workpiece. This in turn melts the area 23 surrounding point A. The instantaneous start has begun.

Figure 4:
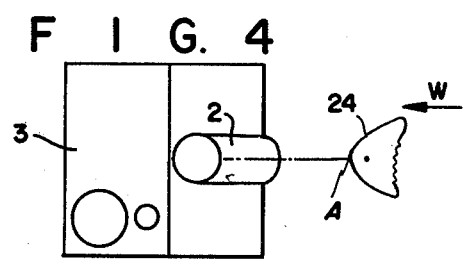

FIG. 4 shows the same area about one-quarter second later than FIG. 3. As the steel workpiece continues to move in the direction of the arrow, the molten puddle 24 beings to be spread by the action of the spreader nozzle oxygen jet in a fan-like shape.

Figure 5:
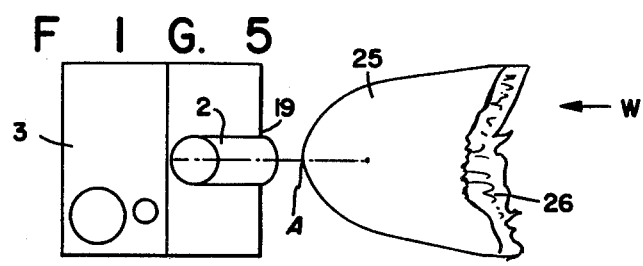

FIG. 5 represents the defective area approximately one-half second later than FIG. 3. Area 25 shows the molten puddle which has been spread on the moving workpiece W by the continuous discharge of oxygen from the spreader nozzle 2. With the puddle having been spread to its miximum width of about 25 cm, the oxygen from nozzle 2 is now shut off, and the scarfing oxygen flow rate from scarfing unit 3 is increased to "take over" the scarfing reaction. The scarfing oxygen stream having picked up the puddle, continues the scarfing cut in the area 26. Area 26 contains both molten metal and slag on top of unscarfed steel and is clearly distinguishable from the all-molten puddle area 25.

Figure 6:
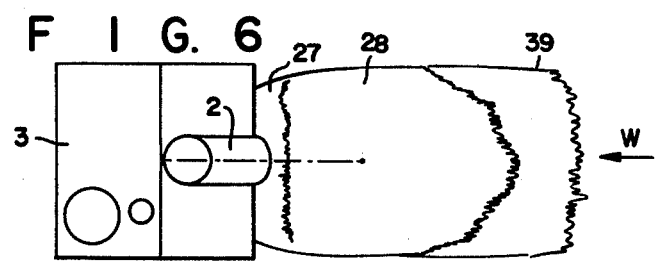

The manner in which the reaction proceeds can be seen from FIG. 6, which represents the reaction about 1 second later than FIG. 3. Area 27 has been scarfed, area 28 is molten but metal removal has not yet taken place, and area 39 contains a mixture of slag and molten metal on top of unscarfed steel. As the surface of the metal moves by under the scarfing apparatus, it goes through three clearly distinguishable stages, the first being an area of molten metal and slag on top of unscarfed steel, the second molten metal alone, and third, scarfed. At the time shown in FIG. 6, the spreader oxygen flow has been shut off and a full width scarfing cut is being made by the scarfing unit 3. It is important to note that the width of the cut from scarfing nozzle is the same as the width to which the spreader nozzle 2 has spread the puddle. This is important in order to prevent fin formation.

Figure 7:
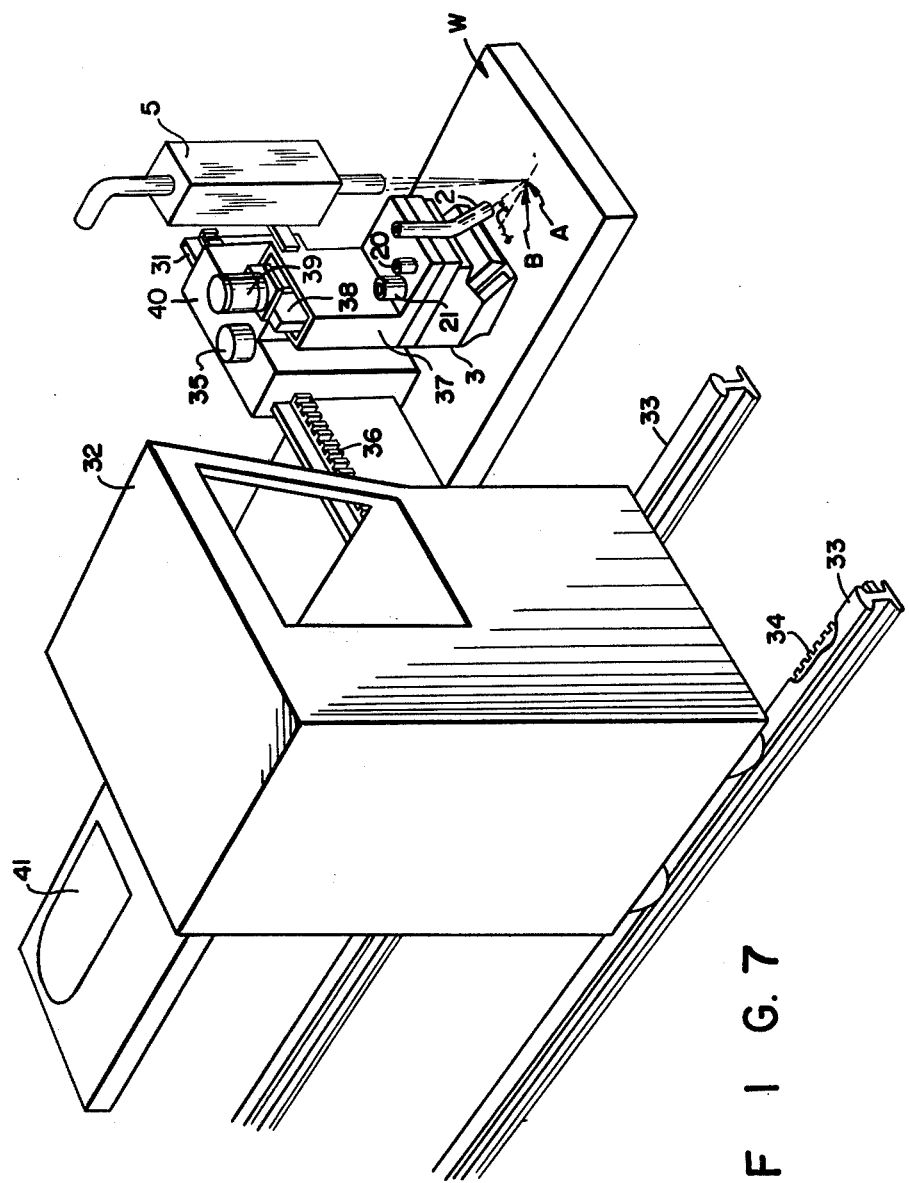
FIG. 7 shows, in perspective view, apparatus for carrying out the present invention, cantilever mounted for remote control.

FIG. 7 shows a perspective view of the apparatus of FIG. 1, cantilever mounted for purposes of making the scarfing apparatus movable both laterally across the width of the workpiece W, as well as longitudinally along its length. Horizontal form member 31 is fixedly attached to a rail mounted operators pulpit 32. Pulpit 32 contains the controls for operation of the apparatus, including the laser controls, the oxygen discharged from the spreader nozzle 2, as well as the oxygen and fuel gases which are supplied to scarfing unit 3 through feed pipes 20 and 21, respectively. Pulpit 32 is mobile laterally along the workpiece W on rails 33. A rack 34, fixedly attached to one of the rails, is engaged by a motor driven pinion (not shown) mounted under pulpit 32, permitting the entire cantilever mounted scarfing assembly and pulpit to be controllably moved along tracks 33. The scarfing assembly consisting of the scarfing unit 3, nozzle 2, and laser assembly 5 are all fixedly attached to carriage member 37 which rides up and down on plate 38 which in turn is fixedly attached to housing 40. Motor 39 is used to controllably raise and lower the scarfing assembly by a rack and pinion arrangement (not shown) with the rack fixedly attached to plate 38.

The scarfing assembly and housing 40 is also capable of being mechanically moved across the width of the workpiece W, by motor driven pinion 35 which engages rack 36, fixedly attached to frame 31.

The apparatus shown in FIG. 7 may be used to selectively spot scarf randomly located defects on the surface of the workpiece by being moved in line with the defect and then travelling longitudinally over the defective area. Area 41 illustrates a typical spot scarfing cut made by the apparatus shown.

Figure 8:
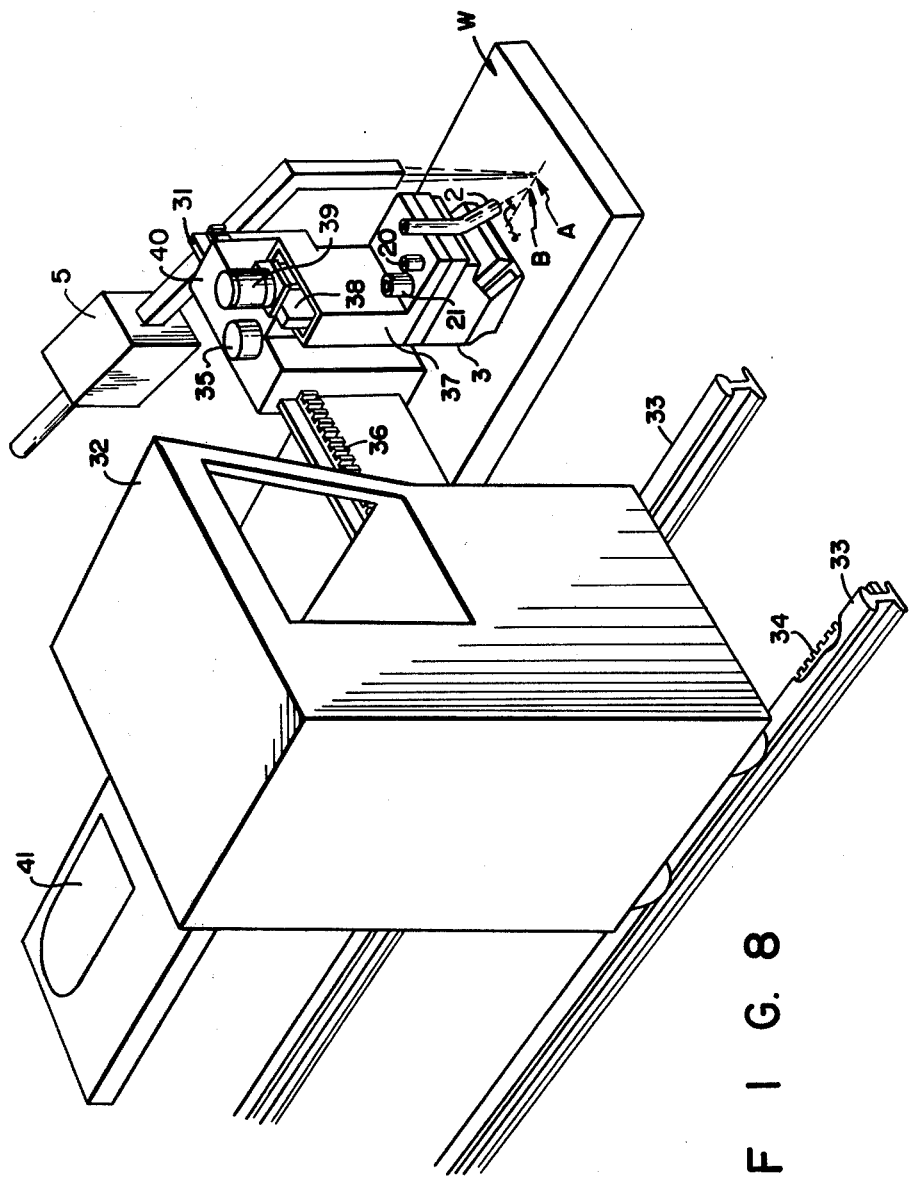
FIGS. 8 and 9 show modified versions of the apparatus shown in FIG. 7.
Figure 9:
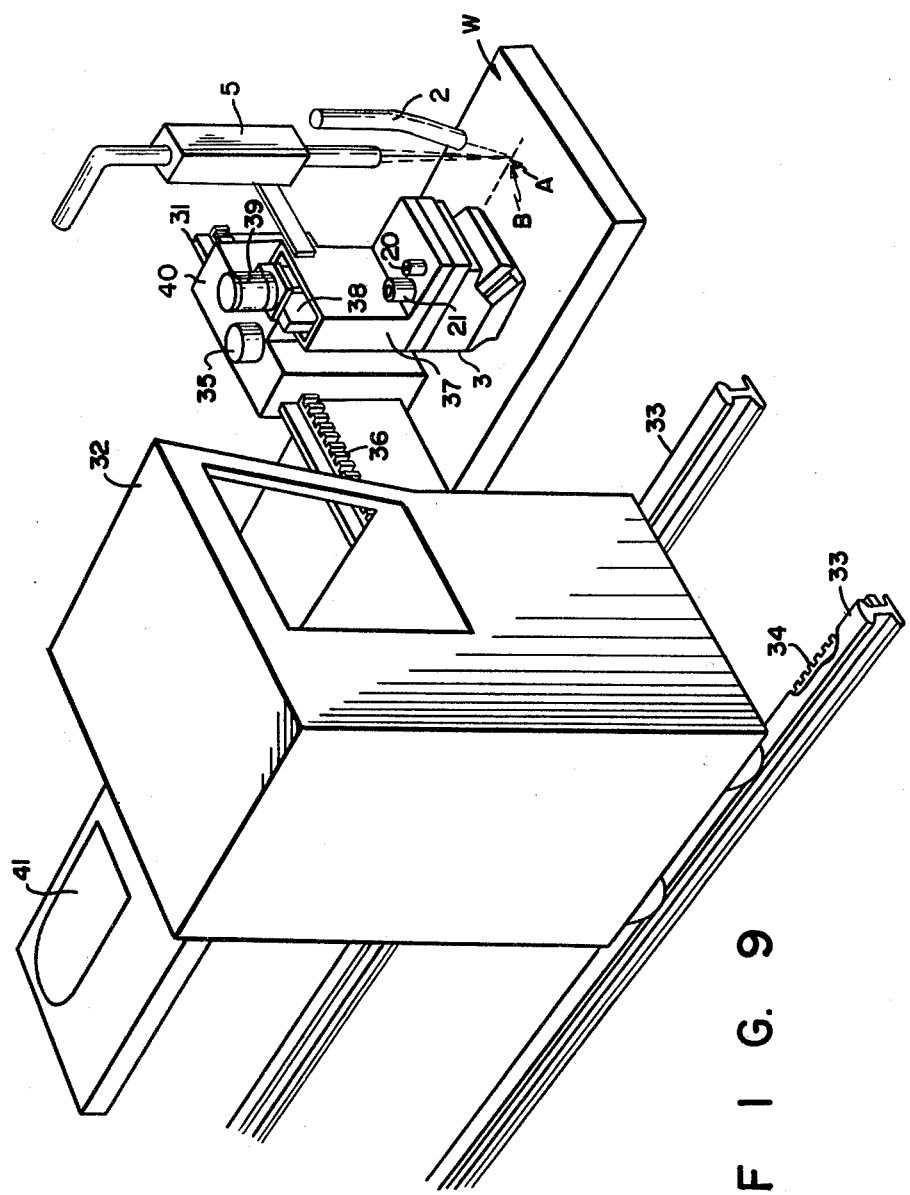

FIG. 8 illustrates an alternative positioning of laser head 5. In the figure parts similar to those in FIG. 7 bear the same reference characters. The laser itself is remotely located. Through the use of an optical arrangement, in this case a 90° prism, the laser beam is directed to the surface of the workpiece. In the arrangement shown in FIG. 9, nozzle 2 is directed at point B from the right side of the workpiece W, causing the puddle to be projected toward the left side of the workpiece in front of the scarfing unit 3. This arrangement permits one to spread the starting puddle more rapidly over a wider area, enabling a wider scarfing cut to be made, than with the same sized nozzle arrangement as shown in FIGS. 7 and 8. Nozzle 2 can, of course, also be located on the left side or anywhere in between. A combination using two such nozzles could also be used; the arrangements of FIG. 7 or 8 to start and the arrangement of FIG. 9 to spread the puddle.

Figure 10:
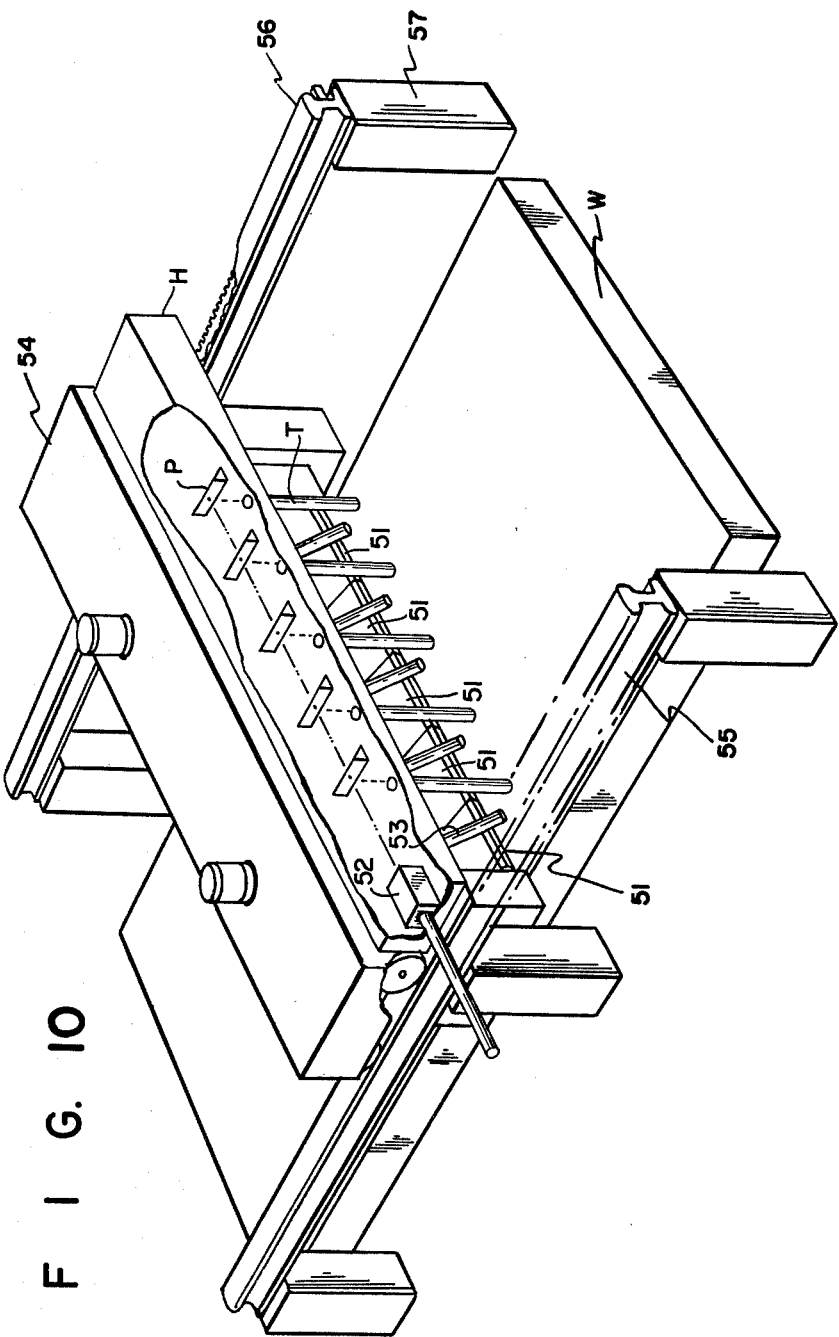
FIG. 10 illustrates in perspective view, another preferred embodiment of the present invention, namely, a plurality of adjacent scarfing units for performing instantaneously started selective, multi-cut, single pass, spot scarfing of the full width of a workpiece.

FIG. 10 illustrates, in perspective, a plurality of scarfing units provided with nozzles for performing selective, multi-cut, spot scarfing with instantaneous or flying starts of an entire width of a workpiece W in a single pass. The plurality of scarfing units 51, a laser head 52 with a plurality of optical arrangements and spreader nozzle 53 are all fixedly mounted upon a mobile carriage 54 which rides upon rails 55 and 56, respectively by rack and pinion motive means. Rails 55 and 56 are fixedly mounted upon tail support members 57. The laser assembly 52 may include a housing H purged with nitrogen or other gas. Mounted in the housing H at predetermined intervals are 90° partial transmitting and partial reflecting prism P. The prisms permit the energy of the laser beam to be split and distributed to a plurality of spots on the workpiece surface. Alternately 90° mirrors may be used which are selected in or out of the beam path to direct the beam to the spot desired. Accordingly, any optical system using either beam splitting and beam selecting can be used. The entire assembly of adjacent flying start scarfing units is able to pass over the full length of the workpiece W, whereby the entire width can be selectively scarfed at normal scarfing speed by the selective operation of each of the scarfing assemblies separately. Although in the apparatus illustrated in FIG. 10 the workpiece is stationary and the scarfing apparatus moves over it, it is possible and in some cases preferable to do the reverse; namely, to have a stationary scarfing apparatus under which the workpieces pass on rollers driven at normal scarfing speed.

Figure 11:
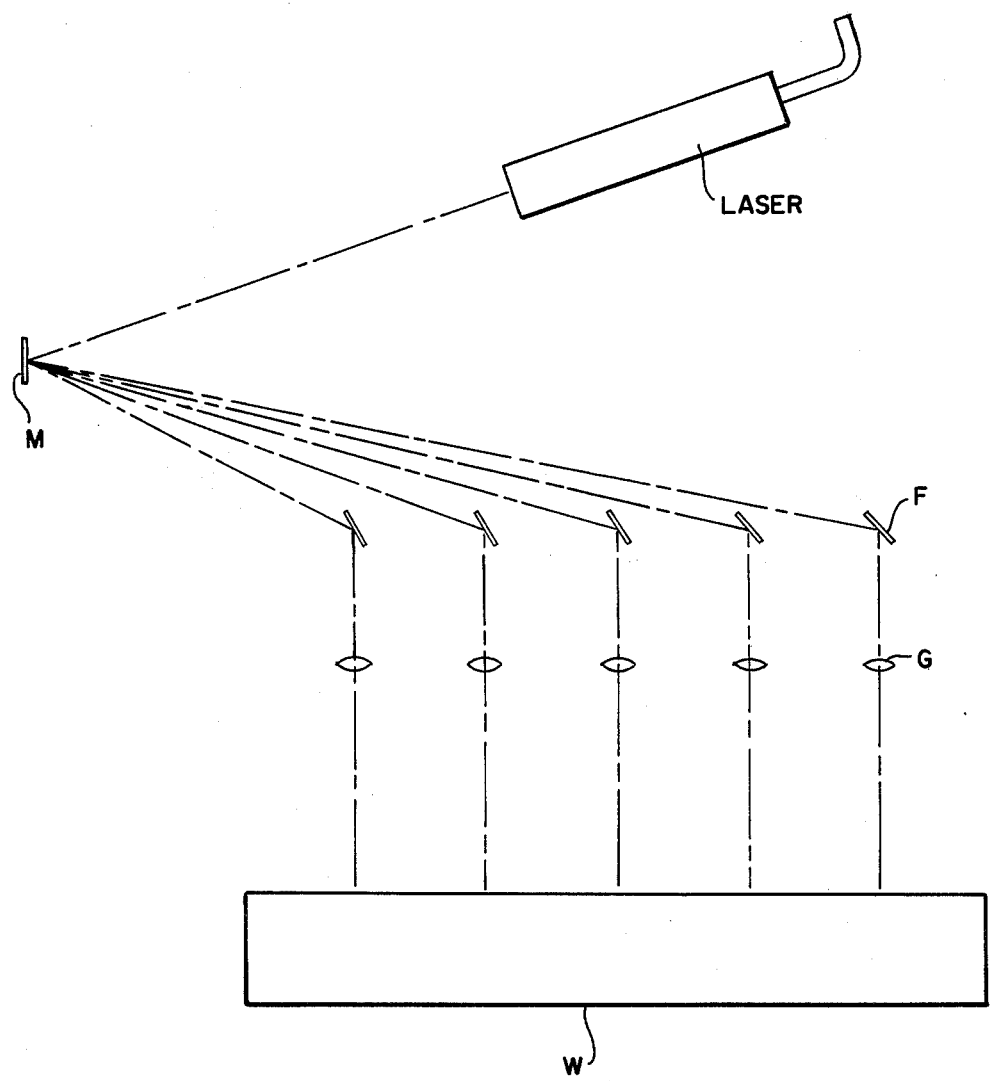
FIG. 11 is a modified version of the laser arrangement shown in FIG. 10.

FIG. 11 shows another alternative to the apparatus shown in FIG. 10. In this embodiment one mirror M would direct the laser beam from laserhead L to a plurality fixed mirrors (F) mounted so as to direct the beam received by such mirrors to the worksurface W through a focusing lens G.

When performing multi-cut selective spot scarfing with apparatus such as disclosed in FIGS. 10 and 11, wherein two or more cuts of overlapping duration may be made, and which may be started at different times but in which the speed of both are determined by the relative motion between the workpiece and the scarfing assembly, no pause or slow down in scarfing speed can be tolerated, from the instant a first cut is begun until the last has been completed. The reason for this is that a pause could uncontrollably affect a cut in progress by an adjacent unit. In other words, if the assembly has to be slowed down, for example, for preheating purposes as in the prior art, an adjoining assembly in which the scarfing oxygen is on would gouge a deep hole in the workpiece. Hence, it should be apparent why no slow down may be tolerated in a multi-pass, selective, spot scarfing operating, and why the instantaneous or flying start is of such crucial importance to the proper functioning of this process.

In addition, it is essential that this process not cause scarfing cuts which either overlap the area to be scarfed by an adjacent unit, or cause excessive fins or ridges between adjacent scarfing cuts. This requirement is satisfied by providing the "gang pass" scarfing oxygen nozzles, i.e., plurality of adjacent scarfing units with nozzles such as shown in FIG. 12.

Figure 12:
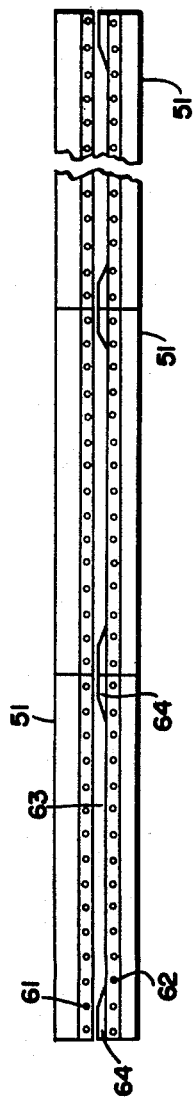
FIG. 12 is a view of the front face of the scarfing oxygen nozzle orifices used in the scarfing units shown in FIG. 10.

FIG. 12 illustrates the front face of the scarfing units employed in the "gang pass" scarfing nozzles of FIG. 10. These nozzles each contain a row of upper and lower post-mixed fuel gas ports 61 and 62, respectively above and below the scarfing oxygen discharge orifice 63. Orifice 63 is typically about 0.6 cm high and 20 cm wide. Its edges are partially closed by the end wall members 64. These are typcially about 3 cm along the bottom edge, 0.4 cm high (at its maximum height) and contain an inclined cut having an internal angle of about 10°. Such end wall members 64 are provided at each end of each scarfing oxygen orifice 63 in order to gradually diminish the flow of oxygen towards the edges of each unit, but without totally closing off the edge of the unit, as is done in the case of the orifice shown in FIG. 2. While orifices of the type shown in FIG. 2 create a scarfing cut on the workpiece, which is narrower than the width of the orifice from which the oxygen is discharged, the "gang pass" orifice 63 of FIG. 12 produces a cut, which though flared toward its outer edges, is of at least the same width as the orifice 63 itself.

Figure 13:
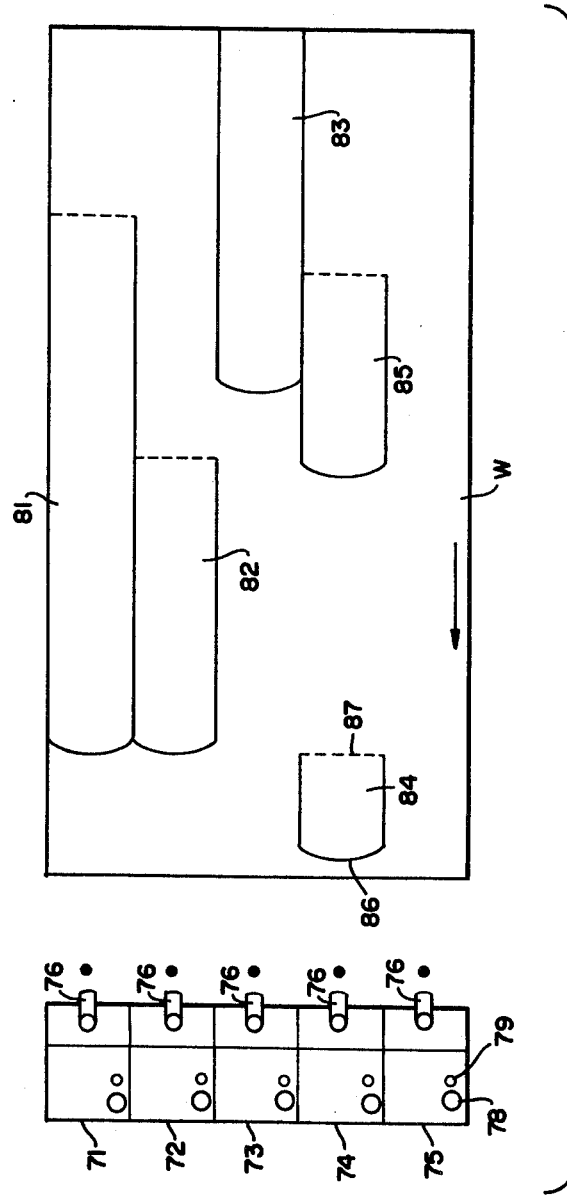
FIG. 13 is a top view of FIG. 10 illustrating the manner in which the invention functions to produce a plurality of instantaneously started spot scarfing cuts in a single pass over the full width of the workpiece.

FIG. 13 is a top view illustrating the manner in which the apparatus shown in FIGS. 10 and 11 function to produce selective, multi-cut, spot scarfing with flying starts on a workpiece. Reference to FIG. 10 will show a plurality of adjacent scarfing units 51, each of which contains an oxygen spreader nozzle 53 and an optical system including prisms P and a focusing lens in tube T, and each of which is provided with oxygen and fuel gas to the scarfine unit.

The areas containing defects on the surface of workpiece W to be spot scarfed out are disignated 81, 82, 83, 84 and 85. As the moving gang of adjacent scarfing units (now identified by reference characters 71, 72, 73, 74 and 75) comes into contact with the workpiece W, a flying start must be made by unit 74 as it reaches the front end 86 of area 84 and must remain in operation until it reaches the back end 87 of area 84, at which time unit 74 is shut off, and units 71 and 72 are started on the fly. As the gang of scarfing units passes over the workpiece, unit 72 will remain on until it reaches the back end of defective area 82, at which time it will be shut off either by an operator or a mechanical or electrical signal, while unit 71 remains on. Unit 74 would be turned on again to begin spot scarfing the area disignated 85. As the beginning of area 83 is approached by the gang of scarfing units, unit 73 is turned on, unit 74 is turned off as the end of area 85 is reached, and unit 71 is turned off as the end of area 81 is reached. During the entire spot scarfing pass, unit 75 remained off, since no defects were contained in the zone of the workpiece over which this particular unit passed.

The amount of laser energy necessary to practice this invention will vary depending on such variables as scarfing speed, workpiece composition and temperature, oxygen flow and purity, etc. However, in order to illustrate the principle of the invention to those skilled in the art, the following example of one mode of practicing the invention is now provided.

Equipment such as shown in FIG. 1 was used. The width of the scarfing unit was 15 cm. Oxygen flow through the orifice 19 was 570 standard cubic meters per hour (SCMH). The fuel gas flow was 40 SCMH. The speed of the workpiece relative to the scarfing unit was 14 meters per minute. The oxygen spreader nozzle has a circular cross-section and had a 2 cm inside diameter. The nozzle angle to steel was 50°. Oxygen flow from the spreader nozzle was 850 SCMH. The laser was a solid state Nd-YAG pulsed laser. Beam diameter out of the laser was 1 cm. Beam divergence was 5 milli-radians. The laser pulse width was 11.0 microseconds. The laser energy was 50 joules. The laser spot size was 2.0 mm diameter and the laser spot (A) was 1 cm ahead of the projection (B) of the center line of the spread nozzle. A 50 cm focal length lens was used to focus the beam to a spot.

In operation the scarfing unit flame was ignited and relative motion was started between the scarfing unit and the workpiece. A signal to begin spot scarfing started flow from the spreader nozzle and when full flow was reached the laser was pulsed forming a molten spot in the steel and instantaneously starting the thermochemical reaction. Approximately ½ second after the laser pulse the oxygen flow from the spreader nozzle was gradually turned off so that ¾ of a second after the pulse the spreader nozzle flow was zero. The scarfing flow was turned on so that at least 50% of full flow was reached when the laser pulsed. The scarfing oxygen then sustained the scarfing pass until the pass was terminated by a predetermined signal. The width of the pass created was 15 cm, the depth was 3 mm. The temperature of the steel was 20° centigrade. The composition was low carbon steel and the fuel gas was natural gas.

The process of this invention can be carried out by igniting the scarfing unit flame from the molten puddle formed by the laser and spreader nozzle, if desired.

While the invention has been described with reference to certain preferred embodiments, it should be understood that modifications may be made to the arrangment of parts or the sequencing of steps without departing from the spirit and scope of this invention. For example, it is possible to use a continuous laser beam because the line made by such beam would be scarfed out as the scarfing reaction progresses. Also two or more jets of oxygen from two or more nozzles of various shapes and sizes can be used to spread the molten spot produced by a laser to any desired spot scarfing width. Further, two or more laser-heads may be used if deemed necessary or desirable. Also, while the invention has been described with reference to thermochemical scarfing of ferrous metal bodies, it should be understood that the invention includes any metal body which is amenable to thermochemical scarfing using oxygen.

What is claimed is:

1. A method for making an instantaneous thermochemical start on the surface of a metal workpiece to be scarfed comprising the steps of:
   a. contacting a preselected spot on said surface where the scarfing reaction is to begin with a laser beam to bring such spot to its ignition temperature;
   b. impinging a high intensity jet of oxygen gas on said surface at said spot, thereby causing an instantaneous scarfing reaction to begin and a molten puddle to form at said spot; and
   c. continuing the impingement of a high intensity jet of oxygen on said puddle until said puddle has spread to a preselected width.

2. Method according to claim 1 wherein the metal workpiece is ferrous metal.

3. The method of claim 1 wherein relative motion between the workpiece and the means for producing said steps is caused to take place at normal scarfing speed prior to and throughout said steps without interruption, thereby producing a flying start.

4. The method of claim 1 wherein relative motion between said workpiece and the means for producing said steps is caused to commence at normal scarfing speed upon contact of said laser beam with said spot.

5. Method according to claim 1 wherein said laser beam is a single pulse of laser power.

6. Method according to claim 3 wherein said laser beam contacts the workpiece surface at a point behind the point of impingement of the high intensity oxygen stream up to 10 cm ahead of said point.

7. Method according to claim 6 wherein the point of impingement behind the point of oxygen impingement is determined by the projection of the inside diameter of the nozzle from which the oxygen stream emanates.

8. The method of claim 3 wherein the high intensity oxygen jet defined by step (b) is directed at said point from a position such that the included angle formed by the central axis of said jet and the line of travel on the work surface is between 30° and 80°, and such that the puddle is spread parallel to the direction of relative motion.

9. The method of claim 3 wherein the intensity oxygen jet defined by step (b) is directed at said spot from a position such that the included angle formed by the central axis of said jet and the surface of the workpiece is between 30° and 80°, and such that the puddle is spread perpendicular to the direction of relative motion.

10. The method of claim 1 which in addition contains the step of
   d. scarfing said surface by impinging a sheetlike stream of scarfing oxygen on the molten puddle directed at an acute angle to said surface.

11. The method of claim 10 wherein said sheet-like stream of scarfing oxygen is gradually diminished in intensity towards the edges of said stream, reaching zero intensity at the lateral edges of the orifice from which it is discharged, thereby producing an individual, fin-free spot scarfing cut whose width is less than the width of said discharge orifice.

12. The method of claim 10 wherein said sheet-like stream of scarfing oxygen is gradually diminished in intensity towards the edges of said stream, but remaining greater than zero intensity at the lateral edges of the orifice from which it is discharged, thereby producing a fin-free spot scarfing cut which will not leave excessively high ridges or deep grooves between adjacent cuts made simultaneously and in like manner, said cut having a width equal to the width of said discharge orifice.

13. The method of claim 10 wherein said sheet-like stream of scarfing oxygen is substantially uniform in intensity across the entire width of the orifice from which it is discharged, thereby producing a conventional scarfing cut.

14. The method of claim 11 wherein the width of said cut produced is equal to or greater than the width of the started puddle.

15. The method of claim 12 wherein the width of said cut produced is equal to or greater than the width of the started puddle.

16. The method of claim 13 wherein the width of said cut produced is equal to or greater than the width of the started puddle.

17. Apparatus for initiating a thermochemical reaction on the surface of a metal workpiece comprising in combination a scarfing machine having a scarfing unit provided with means for discharging a pre-heat flame and a scarfing oxygen stream toward a workpiece to be scarfed;
   an oxygen spreader nozzle mounted on such scarfing machine and located in front of such scarfing unit inclined at its discharge end so as to provide a high intensity jet of oxygen at an angle to the surface of the workpiece some pre-determined distance ahead of the scarfing oxygen stream; and
   a laser provided on such scarfing machine and having an optical system associated therewith for focusing a laser beam on the surface of the workpiece.

18. Apparatus according to claim 17 wherein means is provided for causing relative motion between said scarfing machine and said workpiece.

19. Apparatus according to claim 17 wherein said laser is a pulsed laser.

20. Apparatus according to claim 17 wherein said laser is a solid state laser.

21. Apparatus according to claim 17 wherein said laser is a Nd-YAG crystal.

22. Apparatus for initiating a thermochemical reaction on the surface of a ferrous workpiece, comprising in combination a scarfing machine having a plurality of scarfing units provided with means for discharging a preheat flame and a scarfing oxygen stream toward a workpiece to be scarfed;
   a plurality of oxygen spreader nozzles mounted on said scarfing machine, each of said oxygen spreader nozzles being located in front of a scarfing unit and inclined at its discharge end so as to provide a high intensity jet of oxygen at an angle to the surface of the workpiece some predetermined distance ahead of the scarfing oxygen stream;
   at least one laser provided on said scarfing machine and having associated therewith an optical system capable of providing a plurality of focused laser spots on the workpiece.

23. Apparatus according to claim 22 wherein said laser optical system includes a plurality of partial transmitting and partial reflecting means mounted in a laser housing at predetermined intervals so that the energy of laser beam may be split and distributed to a plurality of spots on the workpiece surface.

24. Apparatus according to claim 22 wherein said laser optical system includes a plurality of mirrors mounted in a laser housing at predetermined intervals so that the mirror may be selectively positioned in or out of the laser beam path to direct such beam at a preselected spot on the workpiece surface.

25. Apparatus according to claim 22 wherein a plurality of lasers are provided on said scarfing machine and having associated therewith an optical system capable of providing a plurality of laser spots on the workpiece.

* * * * *

UNITED STATES PATENT OFFICE
CERTIFICATE OF CORRECTION

Patent No. 4,038,108        Dated July 26, 1977

Inventor(s) S.A. Engel and R.E. Fuhrhop

It is certified that error appears in the above-identified patent and that said Letters Patent are hereby corrected as shown below:

In column 1, line 53, "by" should read -- be --.

In column 4, line 65, "behine" should read -- behind --.

In column 5, line 42, "to" should read -- so --.

In column 6, line 56, "miximum" should read -- maximum --.

In column 8, line 6, "tail" should read -- rail --.

In column 9, line 20, "scarfine" should read -- scarfing --.

In column 11, line 10, after "the" (second occurrence) insert

-- high --.

Signed and Sealed this

*Tenth* Day of *January 1978*

[SEAL]

*Attest:*

RUTH C. MASON      LUTRELLE F. PARKER
*Attesting Officer*      *Acting Commissioner of Patents and Trademarks*